June 28, 1960 J. PAVELKA, JR 2,942,926
FOOD SERVER
Filed Dec. 6, 1957 4 Sheets-Sheet 1

Inventor
Joseph Pavelka Jr.
By Rodney Bedell
Lloyd R. Koenig
attys.

June 28, 1960 J. PAVELKA, JR 2,942,926
FOOD SERVER
Filed Dec. 6, 1957 4 Sheets-Sheet 2

Inventor
Joseph Pavelka Jr.
By Rodney Bedell
Lloyd R. Koenig
attys

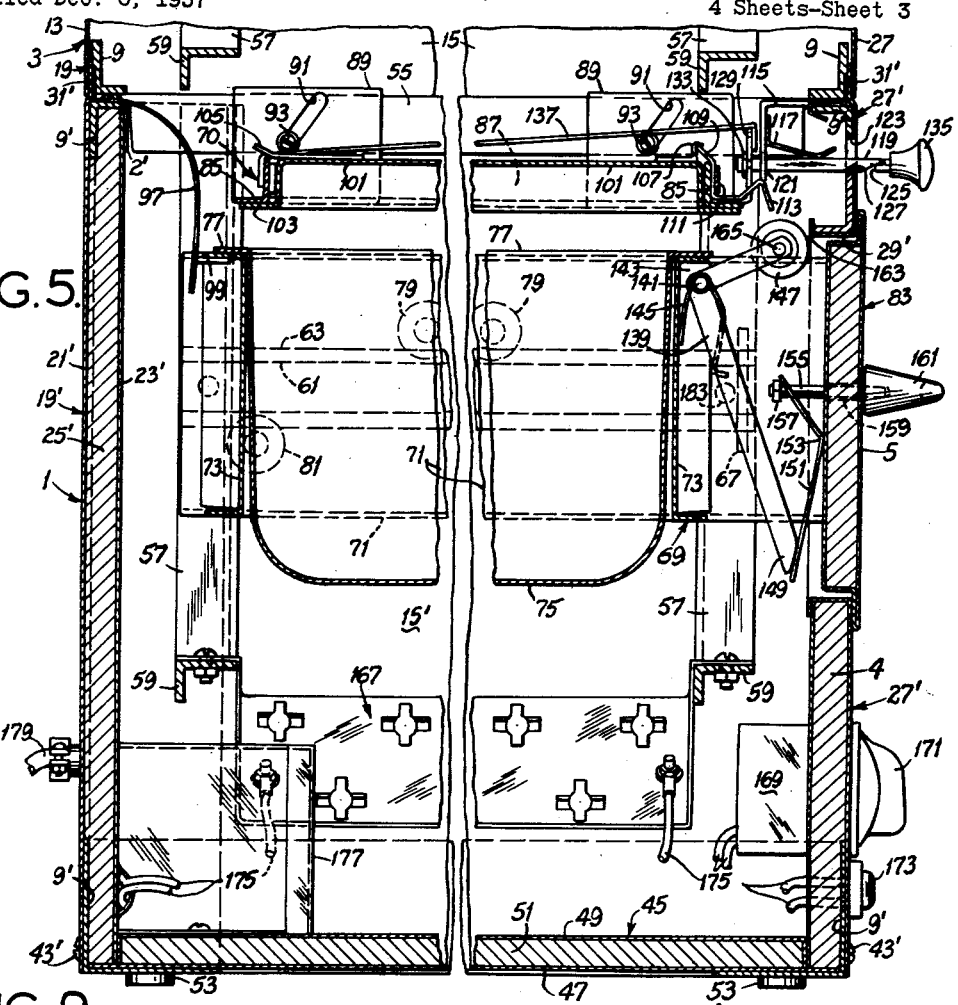
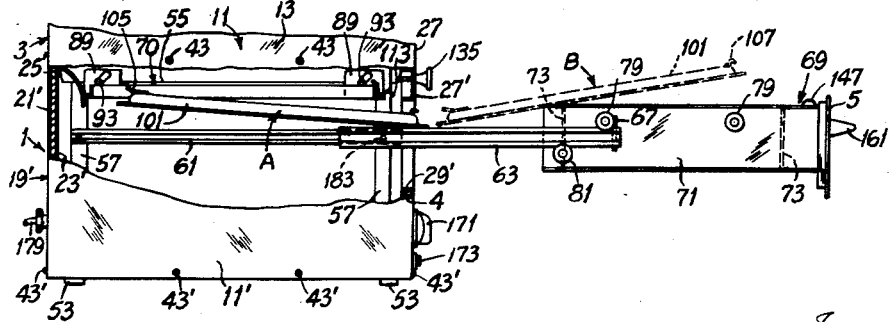

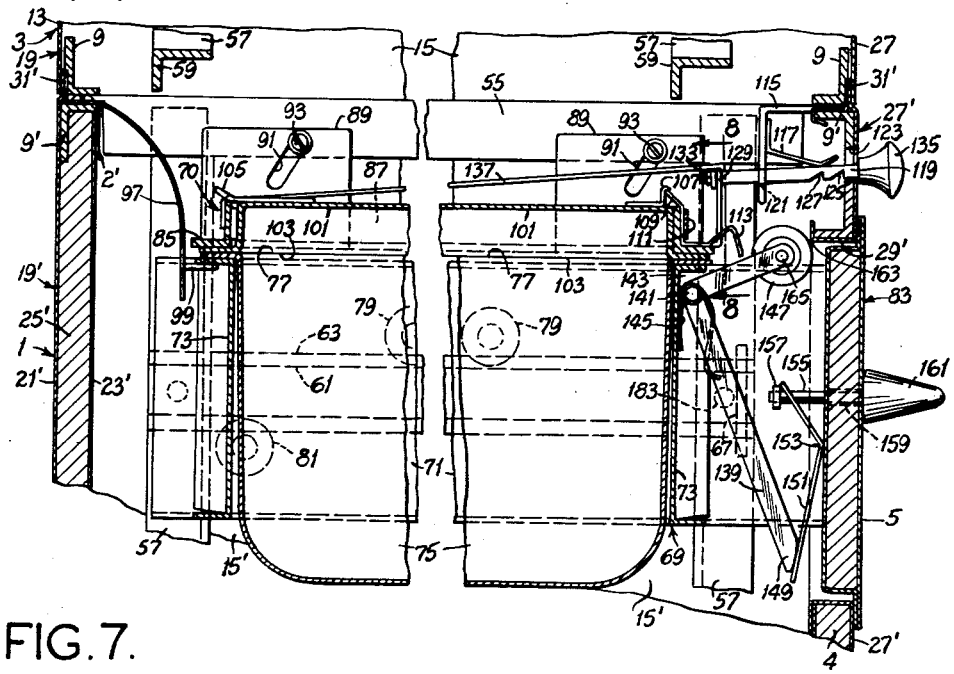
June 28, 1960  J. PAVELKA, JR  2,942,926
FOOD SERVER
Filed Dec. 6, 1957  4 Sheets-Sheet 4

United States Patent Office 2,942,926
Patented June 28, 1960

2,942,926
FOOD SERVER

Joseph Pavelka, Jr., % The Toastswell Co., Inc., 620 Tower Grove Ave., St. Louis 10, Mo.

Filed Dec. 6, 1957, Ser. No. 701,138

7 Claims. (Cl. 312—270)

This invention relates to food servers, and more particularly to sectional drawer-type, warm-food servers for use in restaurants and the like.

Among the several objects of the invention may be noted the provision of a sanitary warm-food server having interchangeable connectible sections, some of which carry controlled heaters and some of which do not; the provision of a server of the class described by means of which, on the one hand, one or more sections in a stack may be maintained at a given temperature and, on the other hand, groups of one or more sections in a given stack may be maintained at different temperatures, any desired arrangement being obtainable by various organizations of two basic modular units; the provision of a server of the class described having sanitary food pans and food-crisping lids which are conveniently removable for washing purposes independently of their carrying means; the provision of an improved crisper lid actuating and latch control mechanism which does not require vertical drawer movements for any of its operations, thereby permitting easier drawer movements; and the provision of drawer latching means responsive to release only upon normal drawer-opening actions, thus further contributing to said smoother drawer movements. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated, Fig. 1 is an isometric view showing an assembly of a typical lower heated and a typical upper unheated section;

Fig. 5 is a further enlarged cross section taken on line 5—5 of Fig. 1, parts being broken away, and illustrating an adjustment for maximum crisping operation, the drawer being shown shut;

Fig. 6 is a view similar to Fig. 5 illustrating an adjustment eliminating crisping operation, the drawer again being shown shut;

Fig. 7 is a view similar to Fig. 6, wherein the drawer has been drawn open;

Fig. 8 is an enlarged vertical section taken on line 8—8 of Fig. 6;

Fig. 9 is a view on a reduced scale similar to Fig. 2, illustrating a certain second captive drawer position for effecting removal of a crisper lid; and, Fig. 10 is an enlarged detail section taken on line 10—10 of Fig. 1.

Corresponding reference characters indicate corresponding parts throughout the several views of the drawings.

Figure 1:
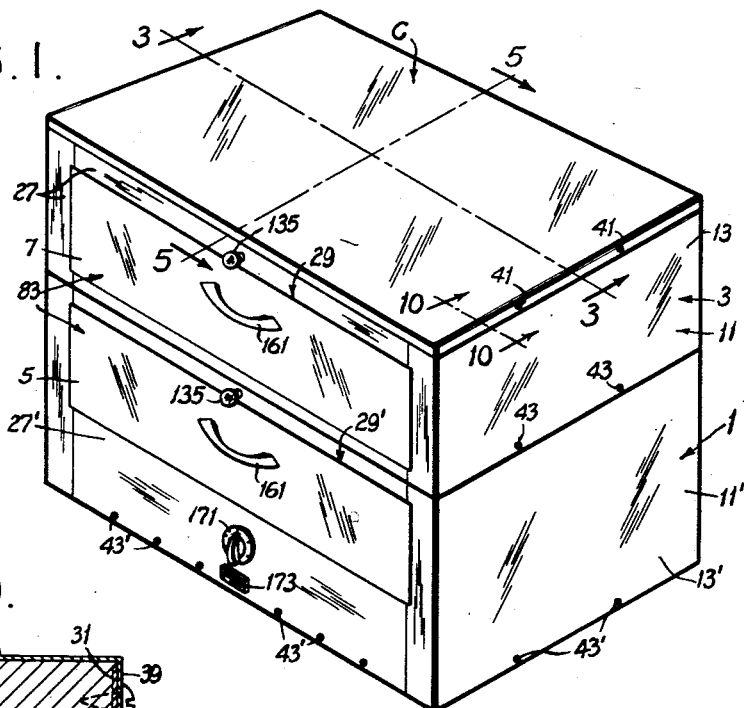
Figure 10:
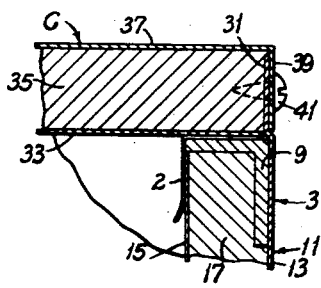
Figure 2:
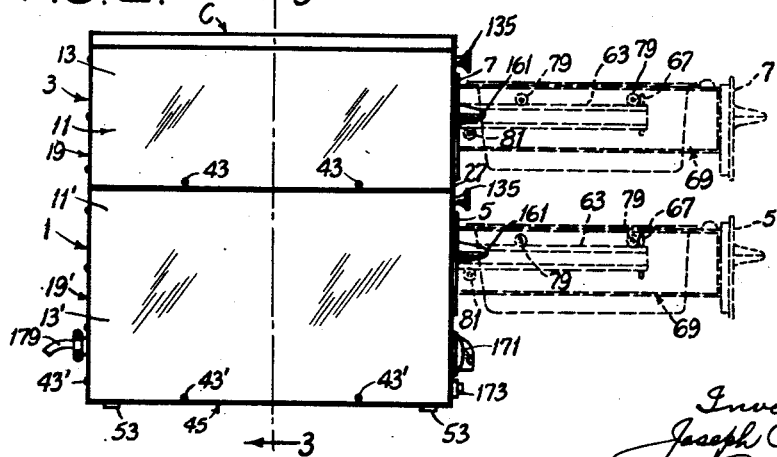
Fig. 2 is a left-end view of Fig. 1, the dotted lines indicating certain captive drawer positions when normally open.

Referring now more particularly to Figs. 1 and 2, there is shown a minimum stack arrangement of two modularly related typical sections 1 and 3, which respectively carry identical drawer and crisper mechanisms. The drawers are indicated in general at 5 and 7, these being shown closed in Fig. 1 and both closed and open (dotted lines) in Fig. 2. In Fig. 9 a drawer is shown further open for purposes to be described. Section 1 differs from section 3 in that it is deeper and carries beneath its drawer and crisper mechanisms certain thermostatically conrolled electric heating elements, to be described.

Figure 3:
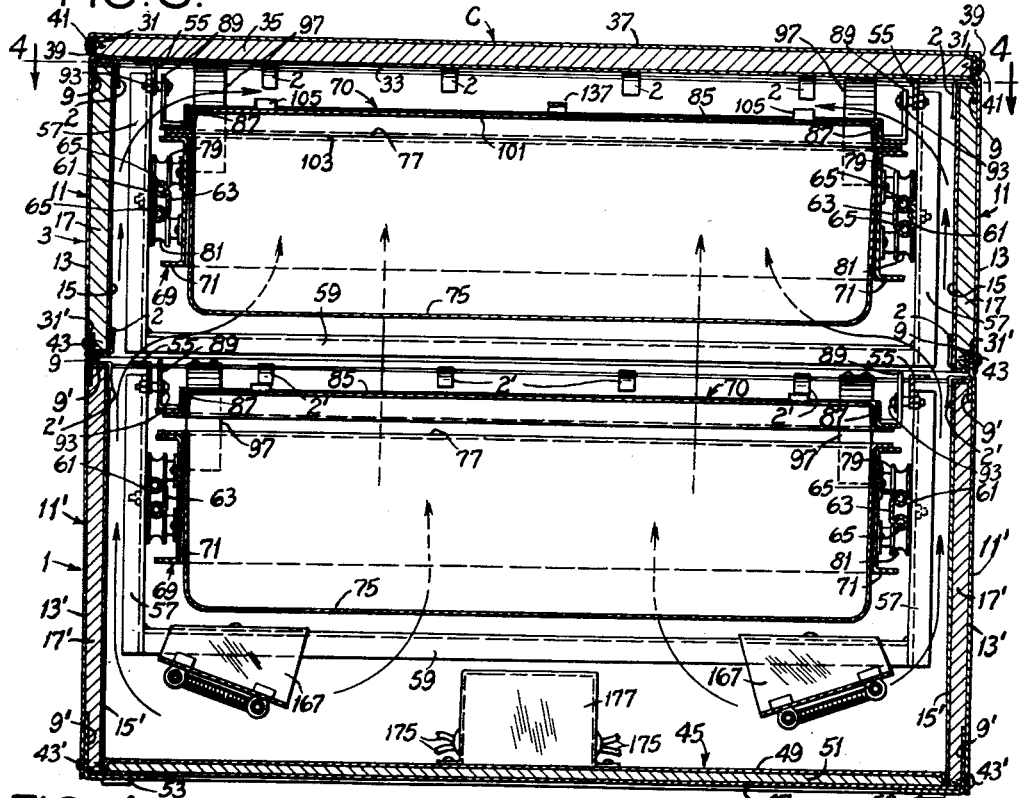
Fig. 3 is a transverse enlarged section taken on line 3—3 of Fig. 1.
Figure 4:
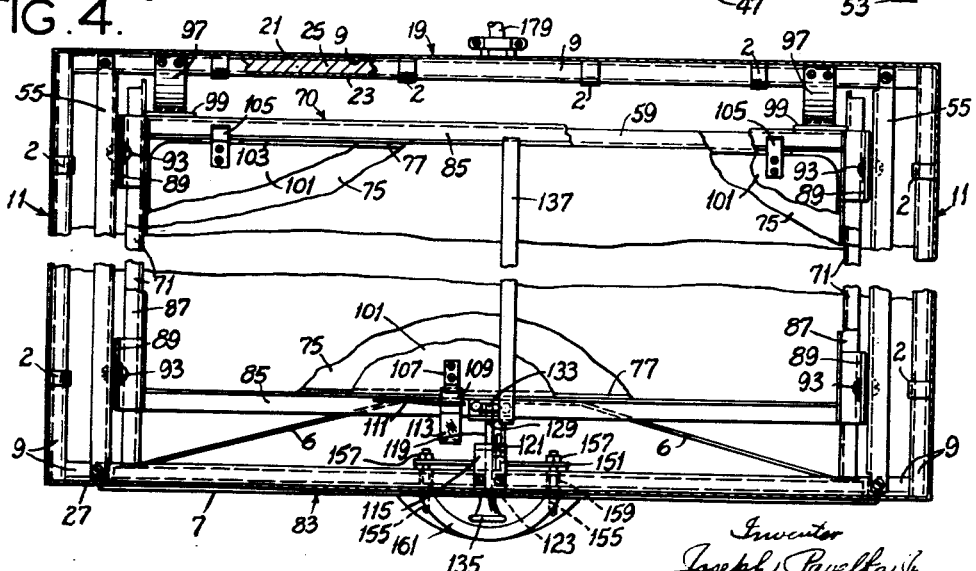
Fig. 4 is a horizontal section taken on line 4—4 of Fig. 3, on the same enlarged scale as Fig. 3.

Referring now to Figs. 3 and 4, section 3 will be seen to be composed of a box-shaped frame 9. This frame 9 supports end panels 11, having outer and inner metal facings 13 and 15, respectively. Between these facings is carried a heat-insulating filling sheet 17. The frame 9 also supports a rear panel 19, having outer and inner metal facings 21 and 23, respectively, between which is carried a heat-insulating filling sheet 25. Clips 2 hold the inner facings and fillings in place. The frame 9 also carries an uninsulated front panel 27, in which is an opening 29 for a drawer frame 7. Around the upper margins of the panels 11, 19 and 27 is provided an upwardly extending flange 31. A rectangular metal sheet 33 is removably positioned within the flange 31, and rests by gravity on top of the frame 9. Above the sheet 33 is removably positioned a sheet of heat insulation 35. Appropriate heat insulation is glass wool or the like, which may be obtained in sheets for the purpose. At 37 is shown a cover having outer flanges 39 telescoping the outsides of the flange 31 and being attached thereto by means of screws 41. The outer faces 13 and 21 of the panels 11 and 19, respectively, are attached to the lower margin of the frame 9 by means of screws 43 which, when removed, leave a space into which an upper flange such as 31 of another section may be inserted before applying the screws 43. By removing the screws 41, the top 37, insulating filling 35 and plate 33 may be removed for the nesting on the section of the bottom of another section corresponding to section 3.

The heating section 1 is similar to the section 3 but is deeper to accommodate certain heating and control elements. Thus section 1 is constituted by a box-shaped frame 9' supporting end panels 11', having outer and inner metal facings 13' and 15', respectively, between which are carried heat-insulating sheets 17'. The frame 9' also supports a rear panel 19', having outer and inner metal facings 21' and 23', respectively, between which is carried another heat-insulating sheet 25', as appears in Figs. 5–7. Clips 2' hold the upper margins of the sheets 15' and 17' in place. The frame 9' also carries a front panel 27', the lower portion of which is insulated, as shown at 4 in Fig. 5. This includes an opening 29' for the drawer 5. The lower margins of the sheet 15' are held in place by a lower panel 45, consisting of a bottom sheet 47, a top sheet 49 and an insulating sheet 51 therebetween. Around the upper margins of the panels 11', 19' and 27' is provided a flange 31'. This flange is offset inwardly to be received behind facing 13 of the upper section, after which screw 43 is inserted.

The outer facing panels 13' and 21' are attached by means of screws 43' to the lower marginal portions of the frame 9'. These screws 43' may be removed, so that the facing panels and the frame will accept between them the upper flange 31 and 31' of another section 3 or 1, as the case may be. If a section 1 is placed upon another section 1, rubber foot grommets 53 are removed from openings carrying them in the bottom of the frame 9'.

In view of the above, it will be seen that one or more sections 3 may be stacked on a section 1, the cover assembly 33, 35, 37 (hereinafter referred to as C) being placed upon the uppermost one, thus leaving the stacked sections spacially interconnected. It will be understood that it is also possible to stack a section 1 on another section 1 by inserting upper flange 31' of the lower section between the lower margin of the frame 9' of the upper section 1 to be supported and the outer sheet 13' or 21', as the case may be, screws 43' being removed to permit this and being thereafter replaced. In this event the sections are not spacially interconnected because the bottom panel 45 is not removable, as is the case with the cover C. It is to be understood also that a section 1 may be stacked on a section 3 but that this would be an unusual arrangement.

Sections 1 and 3 carry frame supports for slidable drawer sections carrying removable food pans. These supports are also for crisper mechanisms carrying removable crisper lids. The constituent parts will now be described, the same numerals being used for all of them, since they are identical in both types of sections 1 and 3.

Each support is constituted by upper crossbars 55 carried upon a frame 9 or 9', as the case may be, and having four depending members 57 connected by crossbars 59. Members 57 are also connected by stationary slider elements or bars 61 which telescopically cooperate with movable slider elements or bars 63. Between the telescoping slider elements 61 and 63 are antifriction rolling balls 65. Internal stops for limiting telescoping are indicated at 183 and at the ends of the movable slider elements 63 are located external stops 67 (see Fig. 9).

At 69 are rectangular drawer frames constituted by side members 71 connected by end members 73 forming rectangular space for the vertical telescopic acceptance of a food pan 75. The pan is flanged at the top, as shown at 77, so that it will be supported upon the upper margin of the rectangle formed by the members 71 and 73.

The fronts of the drawer frames 69 are constituted by heat-insulated front drawer panels 83 attached to extensions of members 71. The panels 83 cooperate with the openings 29 or 29' in sections 3 or 1, as the case may be. Triangulating bracing 6 is employed in the space between these panels 83 and the forward members 73 of the drawer frames.

Each drawer frame 69 is supported upon the slide members 63 by upper pairs of front and rear rollers 79 attached to the members 71, respectively. For normal drawer opening movements (Fig. 2) the front upper rollers 79 engage the stops 67 after members 63 have telescoped out as far as stops 183 will allow. Lower rollers 81 engage the bottoms of the slide members 63. Under circumstances to be described, when the slide members 63 are pulled out, the drawer frames 69 may be rotated temporarily around the upper rearward rollers 79 to allow the forward rollers 79 to pass over the stop 67. Then the drawer may be pulled out farther than normal, the rearward rollers 79 engaging stops 67 while the lower rollers 81 maintain horizontal alignment of the drawer (Fig. 9). The purpose of this will appear.

Above each drawer (when closed) is located a movable rectangular crisper-lid frame composed of crossbars 85 and transverse bars 87, the latter carrying four angle lugs 89 in which are sloping slots 91. These are engageable respectively with supporting roller pins 93 extending inward from the crossbars 55. The arrangement is such that the crisper-lid frame 85, 87 (hereinafter referred to as a whole by the numeral 70) normally may drop down diagonally to a rearward position, such as shown in Fig. 6 from an upper forward position such as shown in Fig. 7. Curved leaf springs 97 attached at the rear to frame 9 or 9', as the case may be, contact the rear member 87 of each crisper-lid frame to push it upward when the drawer frame is pulled forward (Fig. 7). Springs 97 are long enough that they may be contacted by extensions 99 on the rearward crossbar 73 of the drawer frame (Fig. 6), thus removing the action of the spring from the crisper-lid frame 70, normally allowing it to drop back and down. The crisper-lid frame 70 supports a removable crisper lid 101, adapted to telescope upward therein until a bottom flange 103 thereof engages the bottom of the crisper-lid frame 70. In order to hold the lid in this position, rearward clips 105 are provided thereon, engageable over member 87. The crisper lid 101 also has a forward catch 107 adapted to be held up by a latch 109. This latch 109 is mounted on a leaf spring 111, welded to the front bar 85 and provided with a finger-tripped catch 113. By drawing forward the catch 113, the latch 109 may be withdrawn from the catch 107. This allows the forward edge of the crisper lid to drop when desired, for removal from the crisper-lid frame. Further lid removal features will appear below.

In order to control the degree of descent of the crisper-lid frame frame 70 with its contained crisper lid 101, there is provided on the front bar of the frame 9 or 9', as the case may be, an angle member 115 to which is attached a leaf spring 117. A latch bar 119 slides through an opening 121 in member 115 and through an opening 123 in front panel 27 or 27', as the case may be. This latch bar may be placed in any one of three positions, i.e., a rearward position, or two forward positions as determined by notches 125 and 127. Attached to the forward bar 85 of the crisper-lid frame is an angle piece or yoke member 129, slotted as shown at 131 in Fig. 8. At the end of the bar 119 is a lug 133. The latch bar 119 is long enough that when it is in its rearmost position the crisper-lid frame may move diagonally through its entire path between its uppermost and lowermost positions. When the latch bar 119 is drawn forward and hung up by means of notch 127 (Fig. 5) it, through lug 133, draws the crisper-lid frame forward and upward, so that it cannot gravitate downward, regardless of springs 97. When the latch bar 119 is set back and hung up at notch 125, the crisper-lid frame 70 descends halfway. When the latch bar is set entirely back with its control button 135 against panel 27 or 27', as the case may be, the crisper-lid frame may descend its maximum amount when the drawer is shut (Figs. 6 and 7). Slot 131 in member 129 forms a lost-motion connection for relative vertical movement between member 129 and the latch bar 119 when the crisper-lid assembly 70 moves diagonally up and down either part-way or completely. A brace 137 between the rear crossbar 85 of the crisper-lid assembly and the angle member 129 holds the latter rigidly.

Each drawer frame 69 also carries a drawer latch in the space behind its front panel 83. Each latch is constituted by a bell crank 139, pivoted at 141 to a member 143 carried on the front crossbar 73. The bell crank is biased anticlockwise (Figs. 4, 6 and 7) by means of a spring 145. One arm of the bell crank carries a roller 147. The other end comprises a finger 149 engaging an angle plate 151 which rocks at a ridge 153 contacting the back of the drawer panel 83. The upper end of the plate 151 is provided with openings for loosely accepting studs 155 on which are heads 157. The studs pass slidably through openings 159 in the appropriate panel 83, being externally threaded into a handle 161. When the drawer panel 83 is pushed back into its appropriate opening as the drawer is closed, the roller 147 rides under the top of the opening and springs into a position contacting the rear edge of the opening at a point such as 163, as shown in Figs. 5 and 6. The center 165 of the roller is then positioned slightly above a line joining the roller contact point 163 with the center of the pin 141, thus locking shut the drawer. When the handle 161 is pulled, as is natural in order to open the drawer, the plate 151 is first rocked clockwise on the ridge 153, thus rocking bell crank 139 clockwise so as to place the center 165 under point 163, whereupon the roller 147 moves out under the top of the drawer opening.

From the above it will be seen that in most respects sections 1 and 3 are the same, except that section 1 is deeper for the purpose of accommodating heating elements therein. These are composed of electric resistance heater units 167 attached to the crossbars 59 of the contained drawer support. On the bottom 45 is carried an adjustable thermostatic switch and control member 169, operable from a rotary button 171, external to the section 1. A signal lamp 173 is also externally mounted on the section 1. Wiring 175 is employed to interconnect elements 167, 169, 173 and 175 through a junction box 177 mounted in the unit 1. The electric supply line is indicated at 179.

Operation is as follows, assuming that a section 3 has been stacked on a section 1, as shown in Fig. 1:

By turning on the switch and control unit 169 from button 171, electric heaters 167 will heat both the section 1 and the section 3 by convection to the desired degree. It will be noted that convection may freely occur because the drawer frames containing pans 75, and the crisper-lid frames carrying lids 101, are spaced well within the insulated side walls allowing free vertical convective movements of warm air. Thus the temperatures of sections connected as shown in the drawings equalize under thermostatic control (see the darts in Fig. 3, for example). When the drawers are shut, as shown in Figs. 1–6, the drawer latch mechanisms, including rollers 147, hold them shut. At this time the springs 97 have been contacted by the portions 99 of the drawers, so that these springs are pushed out of engagement with the rear ends of the crisper-lid frames 70. If, as shown in Fig. 6, a crisper control button 135 has been pushed in, the crisper-lid frame 70 will gravitate downward, thus placing the lower flange 103 of the crisper lid 101 on the upper flange 77 of the pan 75. This prevents drying out, i.e., crisping, of the food in the pan. If it is desired to have the food crisped, i.e., dried out while warming, the button 135 is pulled forward, so to pull forward the latch bar 119. This causes lug 133 to engage member 129 on the crisper-lid frame 70 pulling the frame upward as shown in Fig. 5. Or the button 135 may be set into intermediate position (notch 125 active) so as only partially to elevate the crisper-lid frame 70, including its lid 101. Under such circumstances the opening between the crisper lid 101 and pan 75 will be reduced, thus resulting in partial crisping or at least slower crisping.

If it is desired to open a drawer from the Fig. 6 position, this can be done readily by pulling on one of the handles 161. This releases the latch mechanism as already described, permitting the drawer frame 69 to be pulled out to the captive positions, as illustrated by dotted lines in Fig. 2. From these positions, service of the warm food may be made. When the pans are empty they may be removed readily from the drawer frame simply by lifting them from the normally open drawers. Thus they may be conveniently washed without the necessity as heretofore of washing an entire drawer frame, which was a difficult operation, lending itself to unsanitary conditions which the present invention avoids. This also avoids scuffing and abuse of the drawer frames or drawers, which are held captive as shown in Fig. 2.

Assuming again that a drawer is shut, as shown in Fig. 6, with the crisper lid 101 gravitated down in closed position on the top of the pan 75, the drawer may be conveniently opened simply by pulling forward its handle 161. The result will be as shown in Fig. 7, after unlatching has occurred. The forward movement of the drawer relieves the springs 97 of pressure from the members 99 on the drawer frames. Consequently, the springs 97 push up against the rear member 87 of the crisper frame, thus pushing it up from the lower Fig. 6 position to the raised Fig. 7 position. Assuming the button 135 to be pushed in, the slotted yoke member 129 at this time rides forward and up with respect to the latch bar 119. The result is that the crisper-lid frame 70 along with its crisper lid 101, is pushed forward, away from the top of the pans 75. This prevents any substantial interference with forward drawer motion toward open position as shown in Fig. 2. The normal limit of drawer movement is determined, as shown in Fig. 2, by the fact that the upper front drawer roller 79 has contacted stop 67 on the end of the extended sliding telescoping bar 63, the forward movement of bar 63 itself being limited with respect to bar 61 by stop 183. This holds the door captive but open in its first normal open position.

In order to remove a crisper lid 101 for cleaning, another extended captive drawer-open position is provided for, as illustrated in Fig. 9. In this case a drawer frame is first pulled out to a position such as shown by dotted lines in Fig. 2. Then it is lifted to bring the front roller 79 over stops 67 and further pulled forward until the rear rollers 79 contact these stops (Fig. 9). Then the operator may reach through the drawer opening 29 or 29′, as the case may be, and pull on the member 113. This flexes spring 111 forward and brings latch 109 from beneath the catch 107. Then the crisper lid may be gripped at its forward edge and brought down through the solid-line position A in Fig. 9 and then drawn forward up through the dotted-line position B in Fig. 9. It then may be conveniently washed without the necessity of removing any of the crisper-lid frame parts. To return the crisper lid after washing, the operations just described are reversed, each drawer being finally placed back on the telescoping bars 63, as shown in Fig. 2. At this time the cleaned trays 75 may also be returned to the drawer frames.

While a stack of only two sections 1 and 3 is shown in Fig. 1 for simplicity of description, it will be understood that additional sections may be added by first removing from the uppermost section the heat insulating ceiling or cover C, which includes the top 37, filling sheet 35 and plate 33. Then an additional section or sections 3 are added and the cover C applied to the uppermost one of them. Any heat engendered in the lower heating section 1 will convect up through all of the sections.

It is to be understood also that several sections 1 may be stacked if it is desired to maintain separate temperatures in adjacent sections. In this event the rubber grommets 53 are removed. Each section is then heat insulated from the others by permanent heat-insulated bottoms of the sections 1. Under some circumstances, it may be desirable to place a section 1 with one or more attached sections 3 on another group including a lower section 1. This obviously may also be accomplished by removing the cover C, after placing one group on the other. Then the cover C is replaced on the top of the column. In this case, each group of sections 3 associated with a section 1 may be maintained at a desired controlled temperature. In view of the above, it will be seen that other combinations of sections 1 and 3 may be made.

Advantages of the invention consist, first, in the interchangeability of the modular sections described, with complete temperature control in one or more sections as desired.

Second, the arrangement is very sanitary, inasmuch as the pans 75 and the crisper lids 101 may be removed from the drawer frames and crisper-lid frames, respectively, for washing them individually, without the necessity as heretofore of removing and washing any drawer frame or crisper frame parts.

Third, the outermost drawer frame positions, such as shown in Fig. 9, do not result in detachment of the drawers from the slide assemblies 61, 63, so that there is no danger of the drawers being misplaced and scuffed.

Fourth, the crisper lid opening and closure movements are effected by straight-line drawer actions requiring no camming up or down of the loaded drawers, the opening and closing movements of the light crisper lid-frames 70 responding to the actions of springs 97. It is to be noted in this respect that the springs are contacted by the inner ends of the drawers only after the drawers have been substantially closed. Thus a drawer action is not interfered with by any substantial sliding movements with respect to a crisper-lid frame or a crisper lid itself.

Fifth, the position of the crisper-lid frame and the crisper lid is readily controlled for maximum crisping conditions or for partial crisping conditions simply by operating the button 135, either when a drawer is open or shut.

Sixth, the drawer latch mechanism requires no more for its operation than the normal forward pull that an operator gives to a drawer handle for drawer-opening purposes. The initial tendency for the drawer to remain latched brings about the relative motion between the handle 161 and the panel 83, to move the latch mechanism including roller 147 into position to clear the drawer opening. This produces a very convenient unlatching and drawer-opening action.

In view of the above it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A food server comprising a section having walls, in one wall of which is a drawer opening, a drawer having a drawer frame, means for sliding said drawer frame through said opening from one position within the opening to an extended captive position beyond the opening, a food pan having a horizontal flange normally supported on said frame, said pan being removable from said frame when the frame is in extended captive position, a crisper-lid frame within said walls, a crisper lid having a horizontal flange supported in said crisper-lid frame, inclined elements on the section walls and lid frame mounting the latter and said lid for up-and-down movement as the frame moves outwardly and inwardly from and to closed position in contact with said pan flange, means mounted on the section walls adapted to bias said crisper-lid frame upward when the drawer frame is pulled out, said biasing means being contacted by said drawer frame when the drawer is pushed in to overcome said bias, whereby the crisper-lid frame may descend into said closed position of its crisper lid with respect to said pan.

2. A food server comprising a section having walls, in one wall of which is a drawer opening, a drawer having a drawer frame, means for pulling said drawer frame out through said opening from one position within the opening to an extended captive position beyond the opening, and a food pan telescoped vertically into said drawer frame, said pan being movable with the frame through said opening when the drawer frame is pushed in, said pan being removable from the frame for cleaning when the drawer frame is in captive position outside of the opening, a crisper-lid frame within said walls, a crisper lid mounted for up and down movement from and to closed position with respect to said pan, means biasing said crisper-lid frame upward when the drawer frame is pulled out, said biasing means being adapted to be contacted by said drawer frame when it is pushed in to overcome said bias, whereby the crisper-lid frame may descend into said closed position of its crisper lid with respect to said pan.

3. A food server according to claim 2, including drawer support means whereby said drawer may be pulled out to a second captive position wholly beyond said opening, allowing manual access through said opening to said crisper lid, manually releasable means readily accessible through the top of the drawer for freeing the lid from its frame, whereby said crisper lid may be moved through said opening and over said drawer for removal from the section.

4. A food server comprising a section having rectangularly related walls, in one wall of which is a drawer opening, relatively sliding members, a pair of which are attached to said walls and another pair of which are movable out through said opening to a predetermined distance, outer stop means on said movable slidable members, a drawer having a rectangular drawer frame, an upper pair of supports on the drawer and spaced apart lengthwise thereof and movably mounted on said movable slidable means, the forward ones of which supports engage said stop means to effect a first extended level drawer position, a food pan in the drawer and removable therefrom when the drawer is open, said forward supports on the drawer being movable over said stops by rotation of the frame on its rearward supports for further outward movement of the drawer, and additional rearward supports on the drawer frame engageable with the bottoms of said movable slidable means adapted to hold said drawer level in a second extended position, a crisper-lid frame within said walls movable in response to drawer frame opening and closing movements to move toward and away from said pan when the drawer frame is in closed position, and manually operable means adapted to hold and release the crisper lid relative to the crisper-lid frame by manual access through said opening when said drawer frame is in said second extended position.

5. A food-warming server comprising a first section having lower thermostatically controlled electrical heating means and having surrounding heat-insulating upright walls, one wall having a drawer opening, a drawer frame supporting a food pan and movable in and out of said opening and above the heating means, said drawer frame being spaced on all sides substantially from said walls to permit upward convection of heat around them, a removable heat-insulating cover with marginal portions depending from and nesting over the upper edges of said section, a second section having heat-insulated side walls and an open bottom, said side walls having marginal portions depending from and nesting over the upper edges of said first section when the cover of the first section is removed, one of said walls of the second section also having a drawer opening, a drawer frame supporting a food pan movable in and out of said last-named opening, said last-named drawer frame also being spaced on all sides substantially from said walls to permit further upward convection of any warm air rising from any open-topped first section with which the second section is connected, said second section having side and end walls with upper edges corresponding to said first-mentioned walls for nesting with said cover.

6. An interchangeable section food-warming server comprising at least one first relatively deep heat-insulated section having lower thermostatically controlled electrical heating means, and at least one second relatively shallow section without such heating means but also having surrounding heat-insulating walls, all sections having front drawer openings and having top rims adapted to receive a commonly fitting removable heat-insulating cover for use on a stack of the sections, said rims being engageable with the bottoms of adjacent sections, each section having a drawer frame supporting a removable food pan, each drawer frame being movable in and out of a drawer opening, a movable crisper-lid frame in each section supporting a crisper lid therein, each drawer frame, pan, crisper-lid frame and crisper lid being substantially spaced from the sides of its containing section to permit upward convection of heat, each crisper-lid frame being movable up and down its respective section to and from a closed drawer therein, resilient means normally biasing each crisper frame upward, and means carried on the drawers contacting a respective biasing means adapted to overcome its bias, whereby upon closing a drawer the respective lid of the respective crisper frame is moved downward toward closure with respect to the respective pan in the respective drawer frame.

7. A food server comprising a compartment with upright walls, one of which has an opening, a drawer frame mounted on compartment walls to move horizontally from a position within the compartment through said opening to an extended position in which the drawer frame projects outwardly of the compartment, a food container within said drawer frame, a crisper-lid frame mounted to slide on the compartment walls, outwardly and upwardly from a position within the compartment through said opening to an extended position projecting from the compartment, a crisper-lid detachably mounted in said crisper-lid frame, said crisper-lid being movable upwardly and downwardly with said lid frame from and toward container closing position, means on compartment walls automatically biasing said crisper-lid frame upwardly when the drawer frame is pulled outwardly of the compartment, said biasing means being contacted by said drawer frame when the latter is pushed into the compartment to overcome said bias whereby the crisper-lid descends into container closing position.

References Cited in the file of this patent

UNITED STATES PATENTS

| | | |
|---|---|---|
| 1,625,945 | Kuhn | Apr. 26, 1927 |
| 1,678,730 | Johnson | July 31, 1928 |
| 1,906,723 | Rosendahl | May 2, 1933 |
| 1,982,504 | Elliott | Nov. 27, 1934 |
| 2,339,339 | Kaser | Jan. 18, 1944 |
| 2,699,368 | Selmer | Jan. 11, 1955 |
| 2,711,944 | Meek et al. | June 28, 1955 |
| 2,846,286 | Gomersall | Aug. 5, 1958 |